Figure 1:
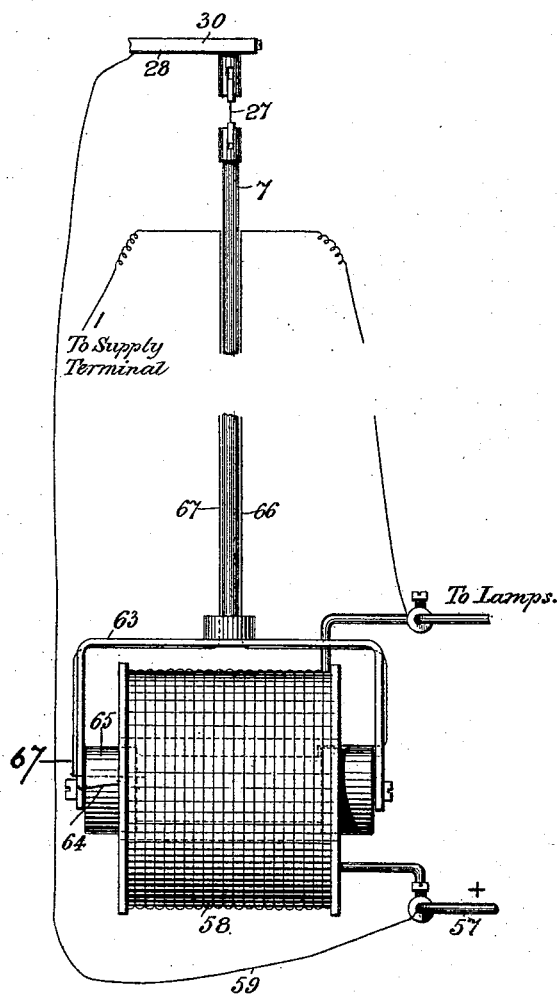

(No Model.) 2 Sheets—Sheet 1.

J. OULTON & J. EDMONDSON.
CORRECTING ELECTRICITY METER.

No. 496,746. Patented May 2, 1893.

Witnesses.
Walter Brierley
J. Brierley Howard

Inventors.
Joseph Oulton
Joseph Edmondson (No Model.) 2 Sheets—Sheet 2.
J. OULTON & J. EDMONDSON.
CORRECTING ELECTRICITY METER.
No. 496,746. Patented May 2, 1893.
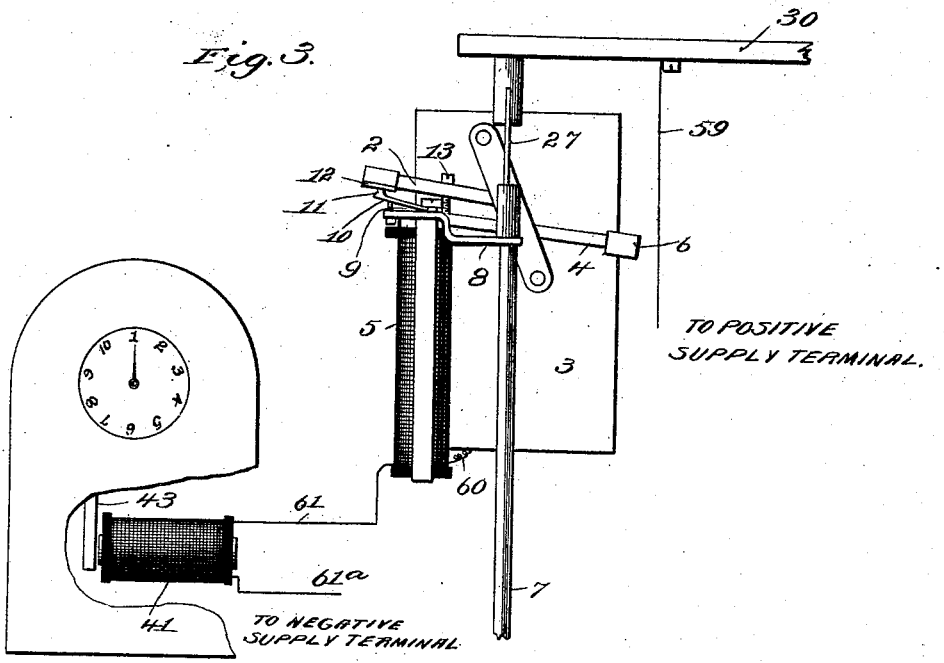
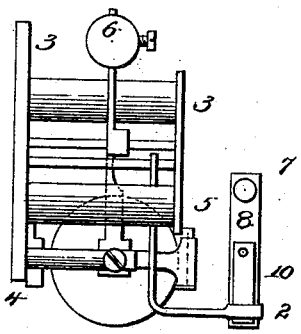

UNITED STATES PATENT OFFICE.

JOSEPH OULTON AND JOSEPH EDMONDSON, OF BRADFORD, ENGLAND.

CORRECTING ELECTRICITY METERS.

SPECIFICATION forming part of Letters Patent No. 496,746, dated May 2, 1893.

Application filed September 28, 1892. Serial No. 447,120. (No model.) Patented in England November 2, 1889, No. 17,387; in France July 22, 1890, No. 207,149; in Belgium July 22, 1890, No. 91,334; in Austria-Hungary November 18, 1890, No. 15,112 and No. 57,452, and in Italy January 26, 1891, No. 28,684.

*To all whom it may concern:*

Be it known that we, JOSEPH OULTON and JOSEPH EDMONDSON, subjects of Her Majesty the Queen of Great Britain, residing at Bradford, in the county of York, England, have invented a certain new and useful Improvement in Correcting Electricity Meters, (for which we have obtained Letters Patent in Great Britain, No. 17,387 of 1889, dated November 2, 1889; in France, No. 207,149, dated July 22, 1890; in Belgium, No. 91,334, dated July 22, 1890; in Austria-Hungary, No. 57,452 and No. 15,112, dated November 18, 1890, and in Italy, No. 28,684, dated January 26, 1891,) of which the following is a specification.

This invention relates to electricity meters in which the current to be measured is made to retard, or accelerate the vibrations of a pendulum, or chronometric balance, the amount of such retardation, or acceleration being the measure of the current consumed.

The object of the invention is to correct the want of proportionality in the record of Watt meters and this we effect by a supplementary solenoid or coil on the pendulum or balance through which is passed a small fraction of the current to be measured. The influence of the main current on this solenoid being in proportion to the square of the fraction of the current passing through the latter, corrects the small error otherwise arising in the register.

A Watt meter constructed as described in our United States Patent No. 430,432, dated June 17, 1890, will measure an electric current proportionally only within certain limits. There is an error, which within those limits is so small that it may be disregarded, but which increases with the current in an increasing ratio. It arises from the law that the force producing the vibrations of a pendulum or balance is proportionate to the square of the number of vibrations in a given time. If therefore $a$ equals the normal number of vibrations and $b$ equals the number to be added by the current under measurement, the force required to produce the latter will be the difference between $a^2$ and $(a+b)^2$ which difference equals $2ab+b^2$. The force of the current however, being equal to $2ab+b$ is absolutely correct only when $b$ equals unity. Thus if the normal speed of the balance is one thousand vibrations per hour and it is calibrated to give one additional vibration per hour for one ampère of current the force required to produce this vibration for each ampère of current will follow the following series.

|  | Vibrations per hour. | Force to produce vibrations. | Error if increments or force be equal. |
|---|---|---|---|
| Normal | 1,000 | 1,000,000 |  |
| 1 vibration | 1,001 | 1,002,001 | 0 |
| 2 " | 1,002 | 1,004,004 | 2 in 4,004 |
| 3 " | 1,003 | 1,006,009 | 6 in 6,009 |
| 4 " | 1,004 | 1,008,016 | 12 in 8,016 |
| 5 " | 1,005 | 1,010,025 | 20 in 10,025 |
| 6 " | 1,006 | 1,012,036 | 30 in 12,036 |
| 7 " | 1,007 | 1,014,049 | 42 in 14,049 |
| 8 " | 1,008 | 1,016,064 | 56 in 16,064 |
| 9 " | 1,009 | 1,018,081 | 72 in 18,081 |
| 10 " | 1,010 | 1,020,100 | 90 in 20,100 |

In a meter in which the current acts on permanent magnets this error is corrected within sufficiently narrow limits by the temporary addition to the magnetism of the said magnets made by the current under measurement.

We correct in a Watt meter according to our invention by adding to the high resistance volt coil a supplementary correcting coil or conductor wound upon same and carrying such small fraction of the current to be measured as is required for the purpose. If the high resistance coil be on or composing a torsional balance instead of a pendulum this supplementary current may be conveyed by means of wires dipping into mercury cups as described in our aforesaid Patent No. 430,432, dated June 17, 1890.

To make clear the nature of our invention we have illustrated one form of it in the accompanying drawings in connection with a pendulum meter, in which—

Figure 2:
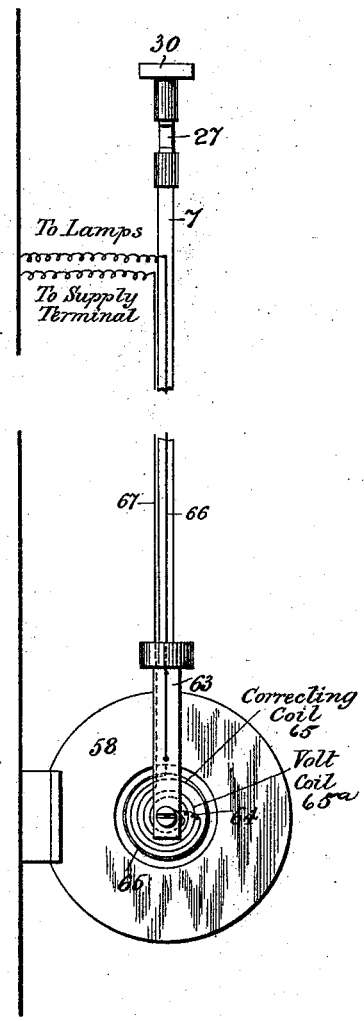

Figure 1 is a front elevation of the pendulum portion only of an electricity meter and Fig. 2 is a side elevation of same. Fig. 3 is an elevation of a part of a pendulum showing the actuating mechanism therefor, and showing in diagram the recording mechanism, and the various circuits. Fig. 4 is a plan of the actuating mechanism.

The pendulum rod 7 is suspended to a metallic bar 30 at the top of the meter case (or to an intermediate vibrating bar hung on a spring) by the customary spring 27 and said pendulum rod terminates in a fork 63 between the extremities of which is held the correcting coil 65 and volt coil 65$^a$ which vibrate with the pendulum rod in a central orifice of a fixed coil 58.

At 57 is the + main supply wire along which the current passes around the fixed main coil 58 to the lamps as indicated. The wire 57 is connected by a shunt wire 59 with the bar 30 through which a current for actuating the movements and index passes down the spring 27 and pendulum rod 7 when a suitable contact is made by the action of the pendulum by means hereinafter to be more fully described. Another current passes along the pendulum rod 7 to the fork 63 thence by wire 64 to the correcting coil 65 and volt coil 65$^a$. From the correcting coil 65 the current passes up the pendulum rod 7 by wire 66 away to the main wire for supplying the lamps. A wire 67 from the volt coil 65$^a$ also passes along the pendulum rod to the negative supply terminal, thus putting the volt coil in parallel with the lamps through the wire 67, as well as in series therewith through the correcting coil 65 and wire 66. The wires 66, 67 may be carried inside the pendulum rod 7 the latter being made hollow for this purpose. A very small current it will thus be seen is continually passing through the shunt circuit which includes the volt coil 65$^a$, the magnetic effect of which is in proportion to the electromotive force of the current. When the current is passing through the fixed main coil 58 to the lamps, the magnetic force of the main coil and of the volt coil combined accelerate or retard the vibrations of the pendulum such acceleration or retardation being registered on the dials of the meter and being except as hereinbefore described in proportion to the watts passing into consumption.

The action of the correcting coil is as follows:—It is calibrated to carry a very small proportion of the current passing into consumption (say in the instance referred to in the foregoing table $\frac{1}{2001}$, one two thousand and first part), and the correcting coil has as many turns as will give one two thousand and first part of the force of the volt coil when one ampère (or other unit of measurement) is going into consumption. Then, counting the effect of the volt coil as unity we have the following result:—

$$\begin{array}{l}\text{Force}\\\text{producing}\\\text{vibrations.}\end{array}$$

$$1 \text{ ampère} = 2{,}000 \times (1+\tfrac{1}{2000}) = 2.001$$
$$2 \text{ ampères} = 4{,}000 \times (1+\tfrac{2}{2000}) = 4.004$$
$$3 \text{ ampères} = 6{,}000 \times (1+\tfrac{3}{2000}) = 6.009$$
$$4 \text{ ampères} = 8{,}000 \times (1+\tfrac{4}{2000}) = 8.016$$

Which will be seen by column 3 of the foregoing table, is the force required to add the required number of vibrations to the normal number (one million) of beats of the pendulum.

In order to keep the pendulum in vibration and to record the same, we use a gravity impulse arm 2, said arm being pivotally mounted in a bracket 3, while pivotally mounted in the said bracket 3, and below the arm 2, is an armature 4, one end of which is near an electro-magnet 5, the opposite end of which is provided with a counterbalance weight 6. On the pendulum rod 7 is a short cranked finger 8, at the outer end of which is an adjusting screw 9, and also a small blade spring 10 fixed at one end by a screw or otherwise on the crank finger 8, the free end of the spring 10 resting on the adjusting screw 9. On the upper side of the spring 10 is a small projection or piece of platinum 11, which as the pendulum vibrates comes in contact with a similar projection 12 on the impulse arm 2. A screw 13 limits the amount of movement of the armature 4, while wires 61, 61$^a$ connect the coil of the electro-magnet 5, and the negative supply terminal with the opposite ends of the coil of an electro-magnet 41, provided with an armature 45, which is adapted when attracted by the magnet to drive a suitable clock-work mechanism. The action of this mechanism to which I here make no claim, it forming the subject matter of another application filed by me September 29, 1892, serially numbered 447,288, is as follows:—In a state of rest or in the normal position, the counterbalance weight 6 holds the armature 4 in contact with the screw 13, and away from the electro-magnet 5, the gravity arm resting on the top side of the armature 4. As the pendulum vibrates and moves to nearly the limit of its arc in one direction, the projection or platinum 11 of the spring on the crank finger 8 will come in contact with the projection or platinum 12 on the impulse arm 2. At the moment of contact and while the pendulum moves through its suppemental arc the circuit will be completed through the wire 59, bar 30, pendulum rod 7, cranked finger thereof, impulse arm, frame 3, coil of magnet 5 connected thereto by wire 60, wire 61, coil of magnet 41, and back to the negative supply terminal, energizing the two magnets the latter of which attracts its armature 45, and actuates the clockwork, while the former attracts its armature 4, permitting the impulse arm to fall. Upon the initial movement of the pendulum in the reverse direction the impulse arm falls with it until it again rests upon the armature 4, when the circuit will again be broken by the part 11 moving away from the part 12, destroying the energy of the magnets and permitting their armature to return to their normal position, the impulse arm being again raised by the armature 4, when the contact will again be made by the cranked finger on the return beat of the pendulum. It will be seen that the impulse arm falls through a longer arc than that through which it is raised by the vibrations of the pendulum, the difference being the height to which the impulse arm is raised by the armature 4. The repeated fall of the impulse arm 2 through this short distance is sufficient to maintain the vibrations of the pendulum. It will be noticed that the circuit through the magnet 41 is made upon each beat of the pendulum, and that therefore the clockwork mechanism driven thereby will indicate the number of the same during any given time.

We do not desire to be understood as limiting our invention for use in connection with a pendulum, as it is obvious that any equivalent for a pendulum now in use in clockwork mechanism may be substituted therefor, and we desire to be so understood in using the word "pendulum" in the following claims.

What we claim is—

1. In electricity meters in which the vibrations of a pendulum are the bases of the measurement the combination with the main coil of a high resistance (or volt) coil and a supplementary coil or conductor, the latter carrying a fraction of the current to be measured for the purpose of making the register proportional to the current substantially as described.

2. In combination the main coil 58 carrying the main current, volt coil 65$^a$, correcting coil wound upon or beside same the latter carrying a portion of the current, fork 63 supporting said volt and correcting coils, and pendulum rod 7 substantially as described.

3. The combination in an electric meter, of a vibrating pendulum, a coil of high resistance and a correcting coil carrying a fraction of the current to be measured mounted on the said pendulum, substantially as described.

In testimony whereof we have hereunto set our hands in the presence of two subscribing witnesses.

JOSEPH OULTON.
JOSEPH EDMONDSON.

Witnesses:
WALTER BRIERLEY,
J. BRIERLEY HOWARD.